United States Patent
Fröhlich et al.

(10) Patent No.: US 6,466,852 B2
(45) Date of Patent: *Oct. 15, 2002

(54) METHOD AND DEVICE FOR PRODUCING AN ERROR SIGNAL IN A MOTOR VEHICLE

(75) Inventors: Martin Fröhlich, Linkenheim-Hochstetten; Mario Bajic, Ludwigsburg; Klaus Ries-Müller, Bad Rappenau, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 09/319,038
(22) PCT Filed: Sep. 24, 1998
(86) PCT No.: PCT/DE98/02845
§ 371 (c)(1), (2), (4) Date: Jun. 1, 1999
(87) PCT Pub. No.: WO99/16634
PCT Pub. Date: Apr. 8, 1999

(65) Prior Publication Data
US 2002/0022917 A1 Feb. 21, 2002

(30) Foreign Application Priority Data
Sep. 30, 1997 (DE) .......................... 197 43 089

(51) Int. Cl.$^7$ .................................. G06F 7/00
(52) U.S. Cl. ................ 701/62; 701/63; 701/67; 477/166; 192/3.51
(58) Field of Search ................. 701/62, 63, 67, 701/51; 477/34, 70, 166, 167; 192/3.51, 3.61; 180/337, 338

(56) References Cited

U.S. PATENT DOCUMENTS

| 4,361,060 A | * 11/1982 | Smyth ............... 477/78 |
| 4,671,397 A | 6/1987 | Asagi et al. .......... 192/0.052 |
| 5,147,254 A | * 9/1992 | Baier ............... 475/121 |
| 5,441,463 A | * 8/1995 | Steeby .............. 477/79 |

FOREIGN PATENT DOCUMENTS

| DE | 3922946 | 1/1991 |
| DE | 4426260 | 2/1995 |
| EP | 0241216 | 10/1987 |
| EP | 0441290 | 8/1991 |

* cited by examiner

Primary Examiner—Yonel Beaulieu
(74) Attorney, Agent, or Firm—Walter Ottesen

(57) ABSTRACT

The invention proceeds from a vehicle having a clutch and a transmission. The clutch is mounted in the drive train of the motor vehicle and the transmission is mounted in the drive train and is changeable with respect to its transmission ratio. Furthermore, means are provided which generate a clutch signal which represents the actuation of the clutch. The essence of the invention is that a change of the transmission ratio is detected. According to the invention, monitoring means are provided by means of which a fault signal is generated in dependence upon the recognized change and the generated clutch signal. The fault signal indicates whether the means, which generates the clutch signal, operates properly. A further variation of the invention evaluates the clutch actuation with the first start of movement of the vehicle after the engine start.

13 Claims, 4 Drawing Sheets

METHOD AND DEVICE FOR PRODUCING AN ERROR SIGNAL IN A MOTOR VEHICLE

FIELD OF THE INVENTION

The invention relates to an arrangement and a method for generating a fault signal in a motor vehicle.

BACKGROUND OF THE INVENTION

A signal is needed for various functions in the engine control (for example, idle control, ignition angle intervention in response to an opening of the clutch) and/or for a road speed control or a distance control. In a motor vehicle, this signal is needed to indicate the state of the clutch (open/closed). To determine the operating state of the clutch, a switch contact can be mounted, for example, directly on the clutch pedal actuated by the driver. The position of such a switch then detects whether the clutch pedal and therefore the clutch is activated or not. For this purpose, the switch is connected via a cable to corresponding control apparatus (for example, engine control apparatus, distance control apparatus).

The functions in the corresponding control apparatus would not run optimally or not at all when there is a defect on such a clutch switch or when there is a break in the cable or when the cable drops off. In this way, fault reactions can occur for the functions which evaluate the position of the clutch switch.

SUMMARY OF THE INVENTION

The object of the present invention is to reliably monitor the function of the clutch switch without additional hardware complexity.

The invention proceeds from a motor vehicle having a clutch, which is mounted in the drive train of the motor vehicle, and a transmission which is mounted in the drive train and is changeable with respect to its transmission ratio. Furthermore, means are provided which generate a clutch signal which represents the actuation of the clutch.

The essence of the invention is that a change of the transmission ratio is detected. According to the invention, monitoring means are provided by means of which a fault signal is generated in dependence upon the detected change and the generated clutch signal. The fault signal then indicates whether the means, which generates the clutch signal, operates properly.

The function of the clutch switch can be effectively diagnosed by the generation of the fault signal in accordance with the invention. Especially an entry into a fault memory is undertaken in response to a detected defect.

In this way, a rapid and reliable determination can be made as to why specific functions in the corresponding control apparatus are not optimally run through or are not run through at all.

With the diagnosis of the invention, customer service or the application personnel (during the development phase of the individual control apparatus) can rapidly determine with the aid of the fault memory why, for example, the vehicle engine has a higher fuel consumption or why the road speed control and/or the distance control can no longer be activated.

It is especially advantageous when the change of the generated clutch signal, which is detected in response to the change of the transmission ratio, is evaluated for generating the fault signal. Here, it is especially provided that the fault signal is generated when, in response to a pregiven number of changes of the transmission ratio:

no change of the generated clutch signal is detected; or, only a pregiven lower number of changes of the generated clutch signal are detected than the pregivable number of changes of the transmission ratio.

In an advantageous embodiment of the invention, it is provided that the presence of a pregiven first operating range of the motor vehicle is detected and the fault signal is further generated in dependence upon the detected first operating range. Here, it is especially provided that the first operating range is pregiven in that, in this first operating range, no change of the transmission ratio is possible without an actuation of the clutch. To generate a fault signal, only the changes of the transmission ratio are applied which take place during the presence of the first operating range.

The essence of this configuration is that a check is made as to whether in the operating range in which the gear change takes place, also each gear change must be connected to an actuation of the clutch. This increases the reliability of the diagnosis according to the invention.

Rpm quantities can be detected to detect the presence of the pregivable first operating range. The rpm quantities represent the output rpm of the motor vehicle engine and an rpm present at the transmission. The presence of the first operating range is then detected in dependence upon the detected rpm quantities.

In a further embodiment of the invention, it is provided that the monitoring means is so configured that the presence of a pregivable second operating region of the motor vehicle is detected and the fault signal is further generated in dependence upon the detected second operating region. Here, it is especially provided that an accelerator pedal value and/or a speed value and/or an engine rpm value is detected. The accelerator pedal value represents the position of the accelerator pedal actuated by the driver of the motor vehicle and the speed value represents the vehicle longitudinal speed and the engine rpm value represents the output rpm of the vehicle engine. The second operating region is then pregiven in that in this second operating region:

the detected accelerator pedal value is greater than a first threshold value; and/or, the detected speed value is greater than a second threshold value; and/or, the detected engine rpm value is greater than a third threshold value; and/or, the time-dependent change of the detected engine rpm value is less than a fourth threshold value.

To generate the fault signal, only the changes of the transmission ratio are applied which take place during the presence of the second operating region.

With this embodiment of the invention, it is advantageously ensured that the vehicle engine is operated during the transmission shifting operation sufficiently long in an operating range in which the gear detection can operate reliably. Especially, it is intended, inter alia, that driving over a poor stretch of roadway, drive train vibrations and slipping tires are detected which put into question a reliable gear detection and therefore a reliable diagnosis of the clutch switch.

The essence of a further variation of the invention is that the diagnosis of the clutch switch takes place at a start of the vehicle engine. Here, a start of the vehicle engine is first detected. The fault signal is then generated in dependence upon the detected engine start, the presence of the clutch signal and the detected roadspeed.

Here, it is especially provided that, for generating the fault signal, the change of the generated clutch signal is evaluated. This clutch signal is in response to a change of the detected speed value detected after the engine start.

To exclude a towing of the vehicle from the diagnosis, it can be provided that the fault signal is only generated when the speed value, which is detected at the detected engine start, is essentially zero.

DESCRIPTION OF THE PREFERRED EMBODIMENTS OF THE INVENTION

The invention will now be explained in detail in the following with respect to an embodiment.

Figure 1:
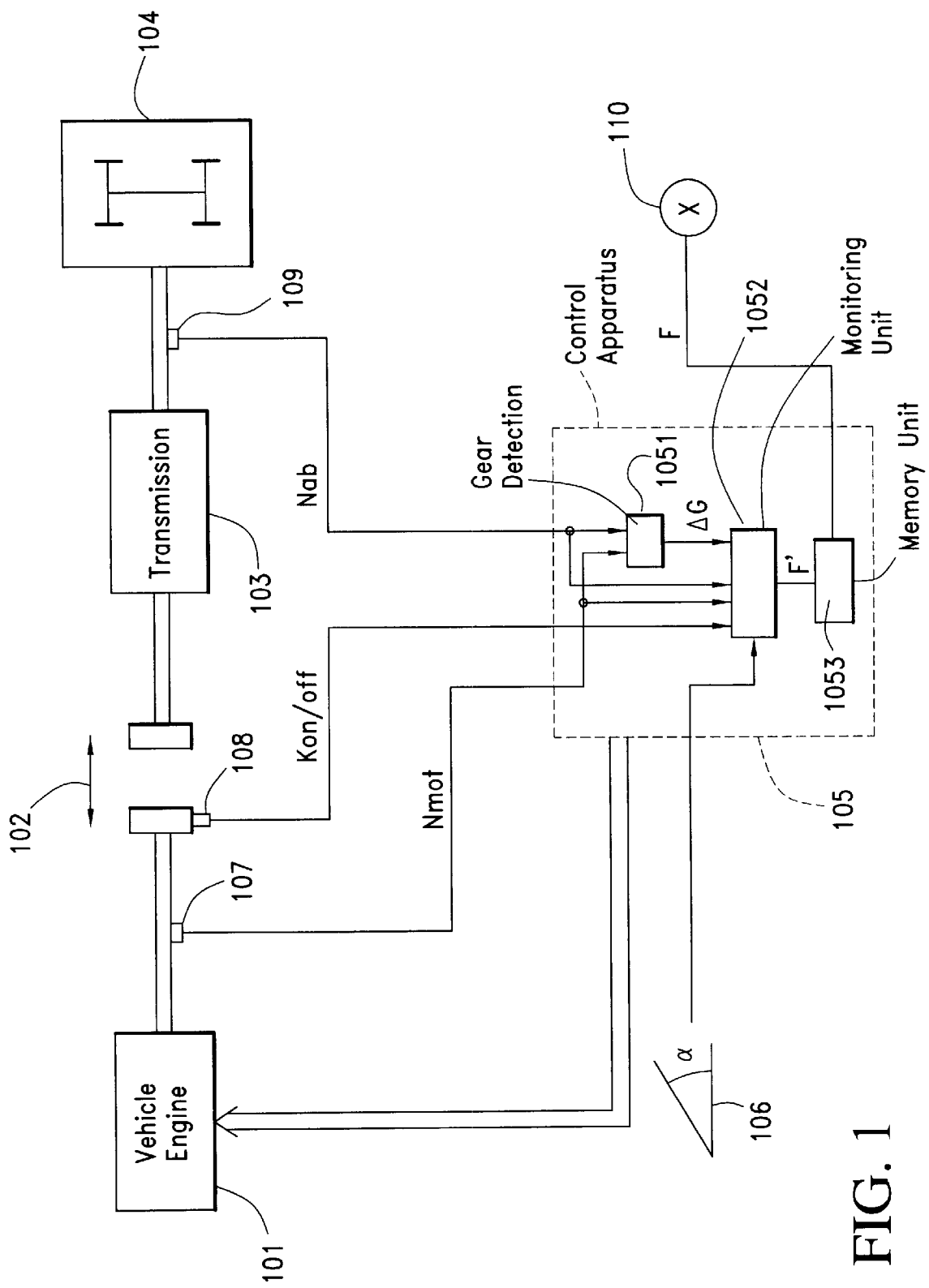
FIG. 1 shows an overview diagram of a drive train having the means according to the invention.

In FIG. 1, the vehicle engine is identified by reference numeral 101. The vehicle engine 101 is connected via the clutch 102 and the transmission 103 to the drive wheels 104 of the vehicle. The clutch 102 can, for example, be opened or closed by the actuation of a clutch pedal (not shown). The actuation of the clutch is indicated by the clutch switch 108 by the generation of the two-step signal $K_{on/off}$. The engine rpm $N_{mot}$ as well as the transmission output rpm $N_{ab}$ or the vehicle speed are detected by the rpm sensors 107 and 109.

In addition to the signals already described, the position α of the accelerator pedal 106, which is actuated by the driver, is also supplied to the control apparatus 105. The control apparatus shown in FIG. 1, is an engine control apparatus which open-loop controls the functions of the engine or closed-loop controls the functions of the engine in dependence upon the shown signals as well as other signals.

Figure 2:
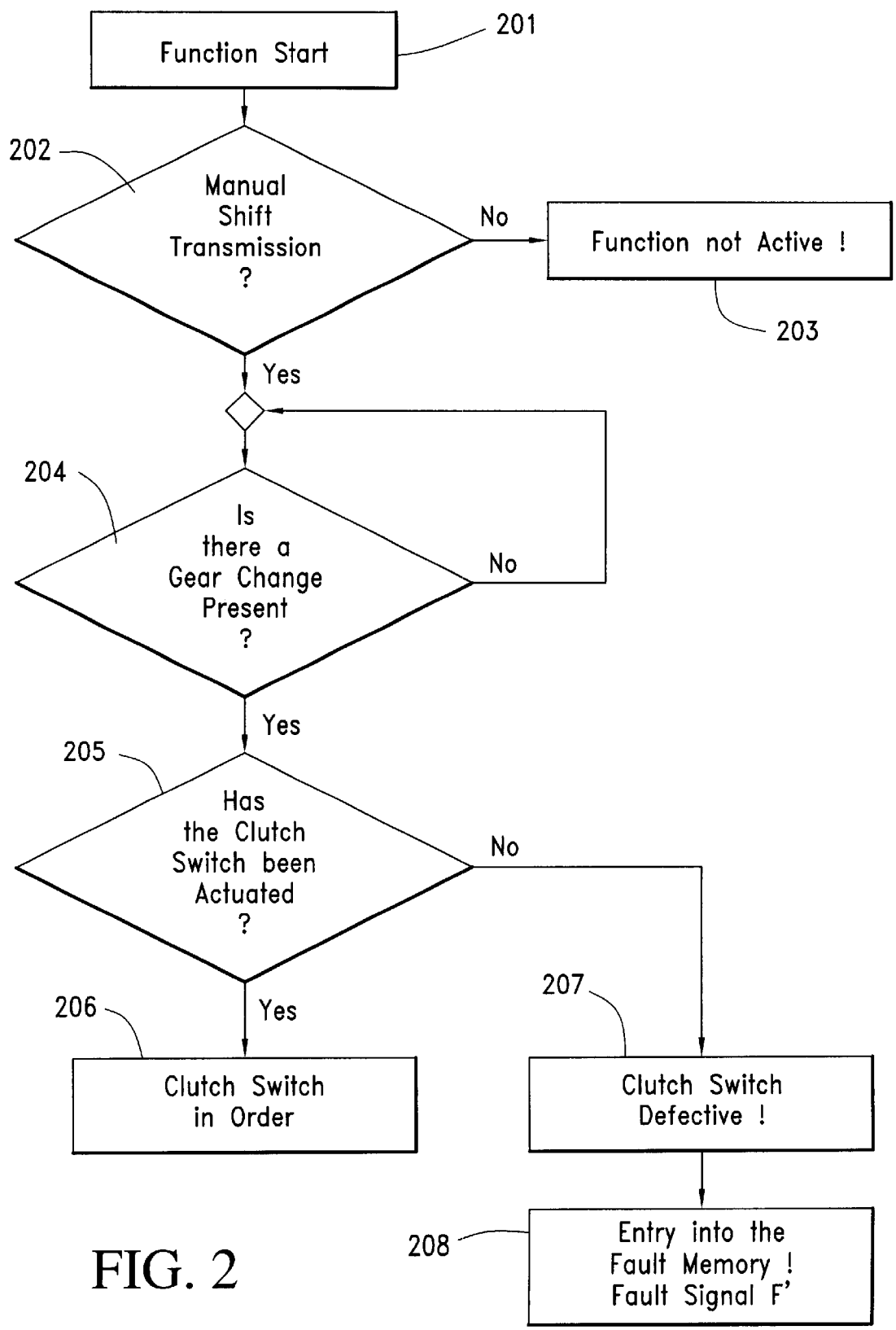
FIGS. 2, 3 and 4 show sequence diagrams of different embodiments of the invention.
Figure 3:
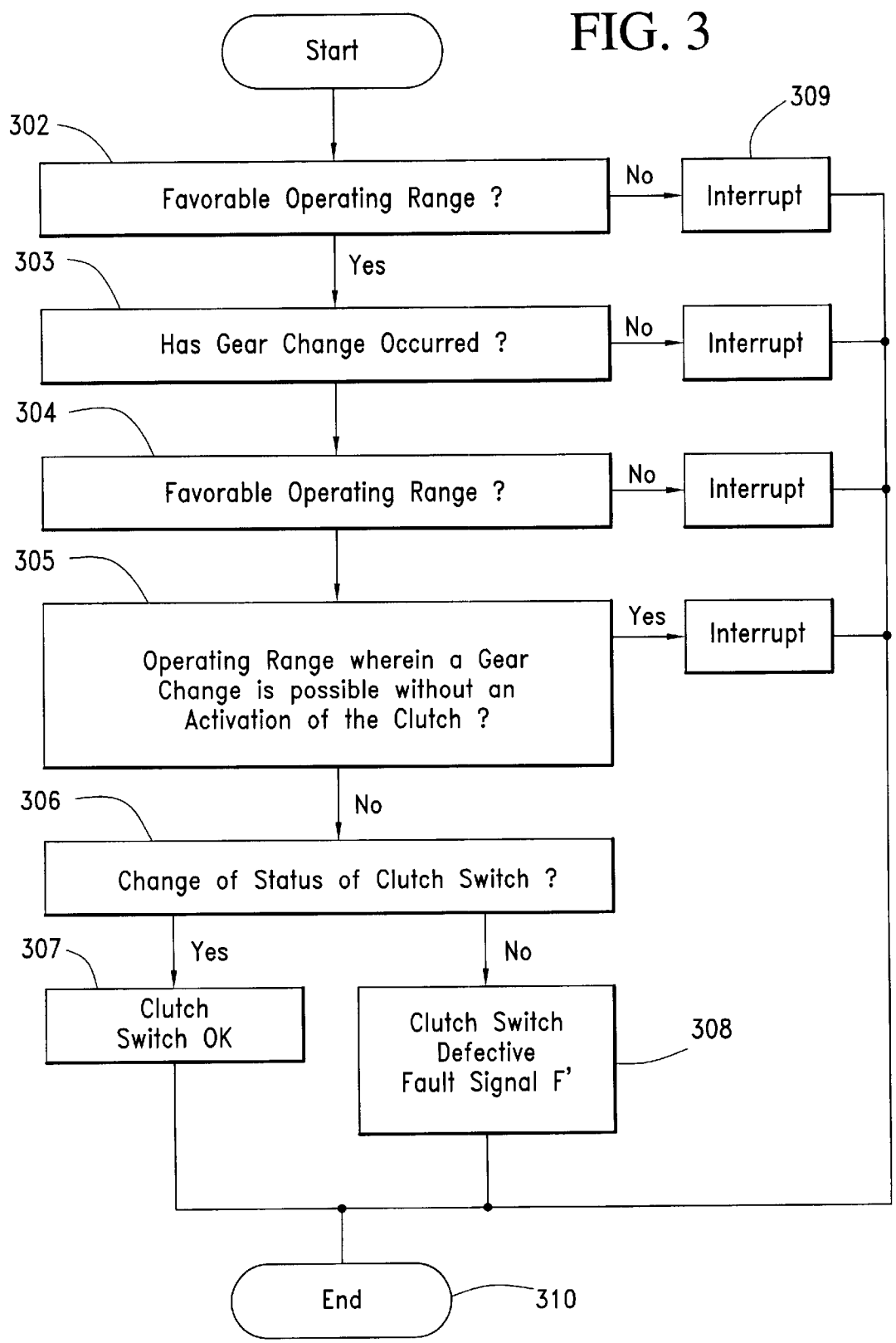

What is essential for the invention is the gear detection 1051 and the monitoring unit 1052 whose functions are explained in greater detail with respect to FIGS. 2 and 3. The monitoring unit 1052 generates the signal F' in response to a detected fault of the clutch switch 108. The signal F' is first conducted to the memory unit 1053. If a pregivable number of faults is exceeded, then the fault signal F is conducted to the display and/or the fault memory unit 110.

The display and/or fault memory unit 110 can be so configured that either the detected fault can be stored so that it can be called up and/or so that it can be displayed.

FIG. 2 shows the sequence of a first embodiment of the invention.

After the start step 201, an inquiry is made in step 202 as to whether the transmission 103 is a manual transmission. If this is not the case, then the total function is inactivated because, in general, no clutch switch is provided for a conventional automatic transmission.

However, if a manual transmission is present, then an inquiry is made in step 204 as to whether a gear change ΔG has taken place. This takes place in the gear detection 1051 (FIG. 1) via an evaluation of the rpm ratio $N_{mot}/N_{ab}$ which changes in dependence upon the transmission gear which has been shifted into.

The inquiry 204 is run through until a gear change ΔG is present. Then, with step 205, a check is made in block 1052 (FIG. 1) via an evaluation of the signal $K_{on/off}$ as to whether the clutch switch 108 has been actuated. Accordingly, a check is made as to whether, during the gear change detected in step 204, the signal state of the signal $K_{on/off}$ has changed.

If this was the case, then the clutch switch 107 is in order (step 206); however, if this is not the case, then an entry is made into fault memory 1053 (step 208) via the step 207.

The sequence shown in FIG. 2 is run through continuously.

Via the gear data ΔG (step 204, block 1051), a defective clutch switch is detected by outputting the fault signal F when a certain number of gear changes, which are stored in memory 1053, are present without a clutch actuation having been detected in step 205.

The reliability of the diagnosis of the invention is increased by the configuration shown in FIG. 3. For this purpose, a check is made in steps 302 and 304 as to whether the gear change ΔG (block 1051 in FIG. 1), which is detected in step 303, takes place during an operating range favorable for the diagnosis. Such an operating range is present when the vehicle engine has been operated sufficiently long in an operating range in which the gear detection 1051 functions reliably. As already mentioned, the gear detection takes place via an evaluation of the rpm ratio $N_{mot}/N_{ab}$ which changes in dependence upon the transmission gear which has been shifted into. The following conditions, which, inter alia, are checked in steps 302 and 304 (block 1052 in FIG. 1) show the presence of a favorable operating range:

1. The accelerator pedal value α, which is supplied to the block 1052, exceeds a first threshold value SW1; and/or, 2. The transmission output rpm $N_{ab}$, which represents the vehicle longitudinal speed $V_{fhzg}$ and is supplied to block 1052, is greater than a second threshold value SW2; and/or, 3. The engine rpm $N_{mot}$, which is supplied to the block 1052, is greater than a third threshold value SW3; and/or, 4. The time-dependent change $dN_{mot}/dt$ of the detected engine rpm $N_{mot}$ is less than a fourth threshold value SW4 with the time-dependent change $dN_{mot}/dt$ being determined in block 1052.

Especially via the fourth condition, the following, inter alia, are detected: driving a poor roadway, drive train vibrations and slipping tires which put a reliable gear detection into question and therefore a reliable diagnosis of the clutch switch.

Depending upon the configuration, a check can be made in steps 302 and 304 as to whether all of the above-mentioned (and additional) conditions are satisfied or if only individual conditions are satisfied. If no favorable operating range is present, then the diagnosis according to the invention is interrupted (step 309).

In step 305, a check is made as to whether a gear change, which is detected in step 303, was possible without an actuation of the clutch. Such a gear change is possible when the transmission rpm and the engine rpm $N_{mot}$ are approximately the same. In such operating ranges, which must be determined in dependence upon the transmission gear, no diagnosis takes place (interruption 309).

However, if a gear change has taken place in an operating range favorable to the gear detection and if this gear change was not possible without an actuation of the clutch, then, in step 306, an inquiry is made as to whether the output signal $K_{on/off}$ of the clutch switch has changed during the shift operation. If this is the case, the clutch switch is in order (step 307). If this is not the case, then the clutch switch can be defective, whereupon an entry into the fault memory 1053 (FIG. 1) is made in step 308 via the signal F'.

Figure 4:
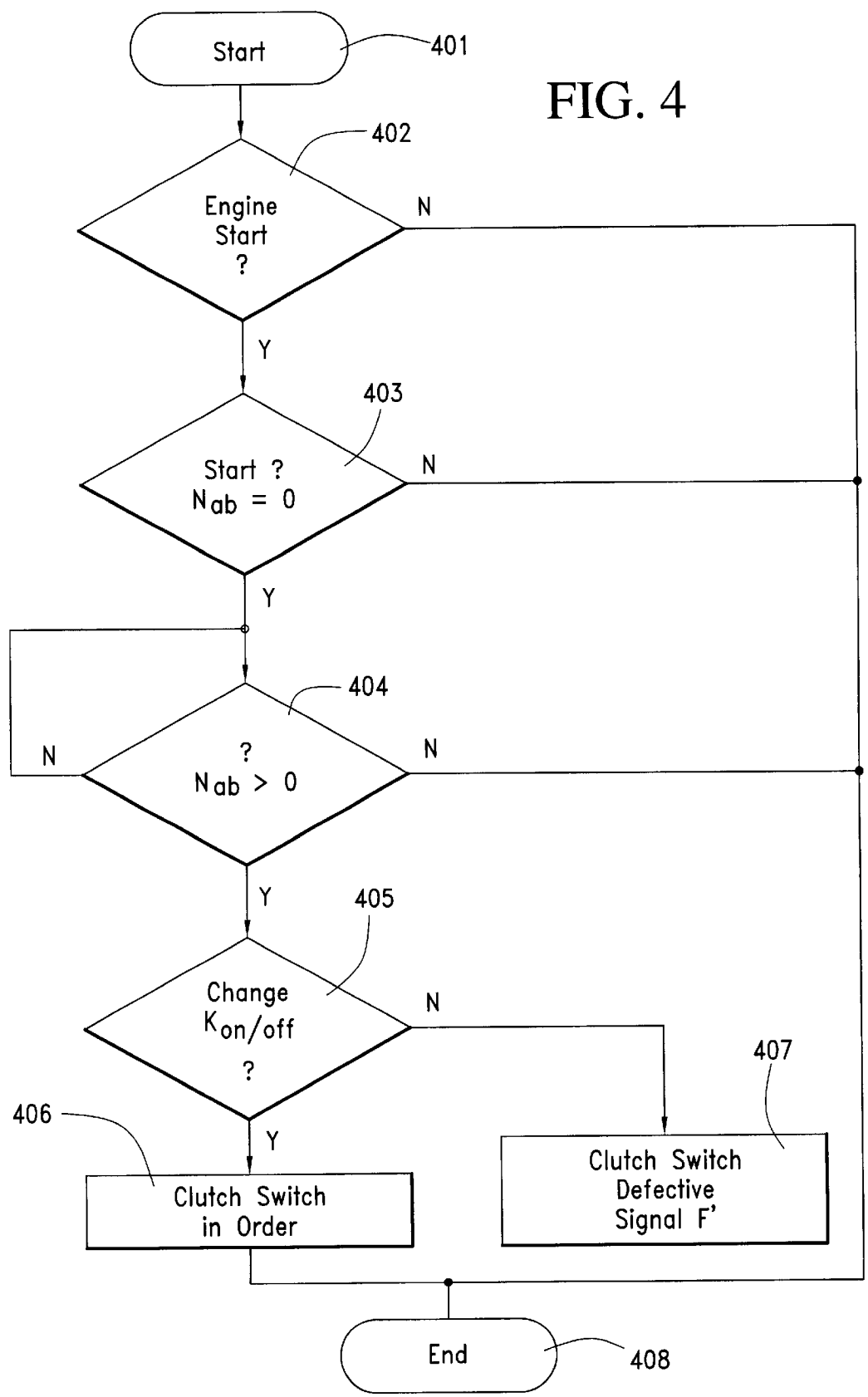

In the variation shown in FIG. 4, the diagnosis can also be carried out after a start of the engine 101.

After the start step 401, a determination is made in step 402 as to whether an engine start is present, for example, by an evaluation of the change of the engine rpm. If this is the case, then an inquiry is made in step 403 as to whether the transmission otput rpm $N_{ab}^{start}$ (which is present at the engine start) or the vehicle speed is equal to zero ($N_{ab}^{start}=0$).

Before the vehicle starts to move, which takes place after the engine start (Nab>0, step 404), a transmission gear must be shifted into and, with this, also an actuation of the clutch and a change of the output signal $K_{on/off}$ of the clutch switch must take place. This is checked in step 405. If this is the case, then the clutch switch is in order (step 406), if this is not the case, then the clutch switch could be defective, whereupon an entry into the fault memory is made in step 407 via the signal F'.

In the last-mentioned variation, no towing of the vehicle can however take place. This is inquired via the condition (Nab=0, step 403) at engine start.

Likewise, a rolling on a hill after engine start is excluded by the diagnosis. This takes place via the check as to engine rpm change during the change of the output signal $K_{on/off}$ of the clutch switch and/or during the change of the transmission gear (not shown in FIG. 4).

What is claimed is:

1. An arrangement in a motor vehicle for generating a fault signal (F) representing the functioning of a device for generating a clutch signal ($K_{on/off}$) representing the actuation of a clutch, said vehicle having a drive train including said clutch and including a transmission mounted in said drive train and said transmission being changeable with respect to its transmission ratio, the arrangement comprising:

detection means for detecting a change ($\Delta G$) of said transmission ratio;

monitoring means for generating said fault signal (F) in dependence upon the detected change ($\Delta G$) and said clutch signal ($K_{on/off}$) generated by said device with said clutch signal ($K_{on/off}$) changing in response to said change ($\Delta G$) of said transmission ratio;

means for detecting the change of said clutch signal ($K_{on/off}$) in response to said change ($\Delta G$) of said transmission ratio; and, said monitoring means being so configured that, for generating the fault signal (F), the change of said clutch signal ($K_{on/off}$) is evaluated.

2. An arrangement for generating a fault signal (F) in a motor vehicle having a drive train and having a clutch mounted in said drive train, the motor vehicle further including: a transmission mounted in said drive train and said transmission being changeable with respect to its transmission ratio, and a device for generating a clutch signal ($K_{on/off}$) representing the actuation of said clutch and said fault signal (F) representing the functioning of said device, the arrangement comprising:

detection means for detecting a change ($\Delta G$) on said transmission ratio;

monitoring means for generating said fault signal (F) in dependence upon the detected chance ($\Delta G$) and said clutch signal ($K_{on/off}$) generated by said device; and, said monitoring means is so configured that said fault signal (F) is generated when, in response to a pregiven number of changes ($\Delta G$) of the transmission ratio, there is no change of the generated clutch signal ($K_{on/off}$) is detected; or, only a pregivable lower number of changes of the generated clutch signal ($K_{on/off}$) is detected than the pregiven number of changes ($\Delta G$) of the transmission ratio.

3. The arrangement of claim 1, wherein said device is configured as a clutch switch whose switch position represents an actuation or non-actuation of said clutch.

4. An arrangement for generating a fault signal (F) in a motor vehicle having a drive train and having a clutch mounted in said drive train, the motor vehicle further including: a transmission mounted in said drive train and said transmission being changeable with respect to its transmission ratio, and a device for generating a clutch signal ($K_{on/off}$) representing the actuation of said clutch and said fault signal (F) representing the functioning of said device, the arrangement comprising:

detection means for detecting a change ($\Delta G$) of said transmission ratio;

monitoring means for generating said fault signal (F) in dependence upon the detected change ($\Delta G$) and said clutch signal ($K_{on/off}$) generated by said device; and, said monitoring means is so configured that the presence of a pregiven first operating range of the vehicle is detected and the fault signal (F) is further generated in dependence upon the detected first operating range; said first operating range is pregiven in that, in this first operating range, no change of said transmission ratio is possible without an actuation of the clutch and, to generate the fault signal (F), only the changes ($\Delta G$) of said transmission ratio are applied which take place during the presence of said first operating range.

5. The arrangement of claim 4, wherein, to detect the presence of a pregivable first operating range, rpm quantities (Nmot, Ne, Nab) are detected, which represent the output rpm of the vehicle engine and an rpm present at the transmission; and, the presence of said first operating range is detected in dependence upon the detected rpm quantities.

6. An arrangement for generating a fault signal (F) in a motor vehicle having a drive train and having a clutch mounted in said drive train, the motor vehicle further including: a transmission mounted in said drive train and said transmission being changeable with respect to its transmission ratio, and a device for generating a clutch signal ($K_{on/off}$) representing the actuation of said clutch and said fault signal (F) representing the functioning of said device, the arrangement comprising:

detection means for detecting a change ($\Delta G$) of said transmission ratio;

monitoring means for generating said fault signal (F) in dependence upon the detected change ($\Delta G$) and said clutch signal ($K_{on/off}$) generated by said device;

said motor vehicle includes a vehicle engine; and, said monitoring means is so configured that the presence of a pregivable second operating range of the vehicle is detected and the fault signal (F) continues to be generated in dependence upon the detected second operating range; means are provided for detecting an accelerator pedal value ($\alpha$) and/or a speed value ($N_{ab}$) and/or an engine rpm value ($N_{mot}$), the accelerator pedal value ($\alpha$) representing the position of the accelerator pedal actuable by a driver of the vehicle and the speed value ($N_{ab}$) representing the vehicle longitudinal speed and the engine rpm value representing the output rpm of the vehicle engine; and, the second operating range being pregiven in that, in the second operating range the detected accelerator pedal value ($\alpha$) is greater than a first threshold value (SW1); and/or, the detected speed value ($N_{ab}$) is greater than a second threshold value (SW2); and/or, the detected engine rpm value ($N_{mot}$) is greater than a third threshold value (SW3); and/or, the time-dependent change of the detected engine rpm value ($N_{mot}$) is less than a fourth threshold value (SW4); and, to generate the fault signal (F), only the changes ($\Delta G$) of the transmission ratio are applied which take place during the presence of the second operating range.

7. An arrangement for generating a fault signal (F) in a motor vehicle having a drive train and having a clutch mounted in said drive train, the motor vehicle further including: a vehicle engine; a transmission mounted in said drive train and said transmission being changeable with respect to its transmission ratio, and a device for generating a clutch signal ($K_{on/off}$) representing the actuation of said clutch and said fault signal (F) representing the functioning of said device, the arrangement comprising:

start detecting means for detecting a start of the vehicle engine;

speed detecting means for detecting a speed value ($N_{ab}$), which represents the vehicle longitudinal speed; and, monitoring means for generating said fault signal (F) in dependence upon the detected engine start, the generated clutch signal ($K_{on/off}$) and the detected speed value ($N_{ab}$).

8. An arrangement for generating a fault signal (F) in a motor vehicle having a drive train and having a clutch mounted in said drive train, the motor vehicle further including: a vehicle engine; a transmission mounted in said drive train and said transmission being changeable with respect to its transmission ratio, and a device for generating a clutch signal ($K_{on/off}$) representing the actuation of said clutch and said fault signal (F) representing the functioning of said device, the arrangement comprising:

start detecting means for detecting a start of the vehicle engine;

speed detecting means for detecting a speed value ($N_{ab}$), which represents the vehicle longitudinal speed;

monitoring means for generating said fault signal (F) in dependence upon the detected engine start, the generated clutch signal ($K_{on/off}$) and the detected speed value ($N_{ab}$); and, monitoring means being so configured that, to generate the fault signal (F), the change of the generated clutch signal ($K_{on/off}$) is evaluated, the change of the clutch signal ($K_{on/off}$) taking place in response to a change of the detected speed value ($N_{ab}$) which is detected after the engine start.

9. An arrangement for generating a fault signal (F) in a motor vehicle having a drive train and having a clutch mounted in said drive train, the motor vehicle further including: a vehicle engine; a transmission mounted in said drive train and said transmission being changeable with respect to its transmission ratio, and a device for generating a clutch signal ($K_{on/off}$) representing the actuation of said clutch and said fault signal (F) representing the functioning of said device, the arrangement comprising:

start detecting means for detecting a start of the vehicle engine;

speed detecting means for detecting a speed value ($N_{ab}$), which represents the vehicle longitudinal speed;

monitoring means for generating said fault signal (F) in dependence upon the detected engine start, the generated clutch signal ($K_{on/off}$) and the detected speed value ($N_{ab}$); and, the monitoring means is so configured that the fault signal is only generated when the speed value ($N_{ab}^{start}$) is essentially zero, the speed value ($N_{ab}^{start}$) being detected when the engine start is recognized.

10. A method in a motor vehicle for generating a fault signal (F) representing the functioning of a device for generating a clutch signal ($K_{on/off}$) representing the actuation of a clutch, said vehicle having a drive train including said clutch and including a transmission mounted in said drive train and said transmission being changeable with respect to its transmission ratio, the method comprising the steps of:

detecting a change ($\Delta G$) of said transmission ratio;

detecting a change of said clutch signal (Kon/off) in response to said change ($\Delta G$) of said transmission ratio; and, for generating said fault signal (F), evaluating said change of said clutch signal ($K_{on/off}$).

11. A method for generating a fault signal (F) in a motor vehicle having a clutch and a transmission, the clutch being mounted in the drive train of the vehicle and the transmission also being mounted in the drive train and being changeable with respect to its transmission ratio, the fault signal (F) representing the function of a device for generating a clutch signal ($K_{on/off}$) which represents the actuation of the clutch, the method comprising the steps of:

detecting a change ($\Delta G$) of said transmission ratio;

generating the fault signal (F) in dependence upon the detected change ($\Delta G$) and the generated clutch signal ($K_{on/off}$); and, the fault signal (F) is generated when, in response to a pregivable number of changes ($\Delta G$) of the transmission ratio no change of the generated clutch signal ($K_{on/off}$) is detected; or, only a pregivable lower number of changes of the generated clutch signal ($K_{on/off}$) is detected than the pregivable number of changes ($\Delta G$) of the transmission ratio.

12. A method in a motor vehicle for generating a fault signal (F) representing the functioning of a device for generating a clutch signal ($K_{on/off}$) representing the actuation of a clutch, said vehicle having a drive train including said clutch and including a transmission mounted in said drive train and said transmission being changeable with respect to its transmission ratio, the method comprising the steps of:

detecting a start of said vehicle engine;

detecting of a speed value ($N_{ab}$) which represents the vehicle longitudinal speed; and, generating said fault signal (F) in dependence upon the recognized engine start, the generated clutch signal ($K_{on/off}$) and the detected speed value ($N_{ab}$) as well as by evaluating the change of the generated clutch signal ($K_{on/off}$) with the change of the clutch signal ($K_{on/off}$) taking place in response to a change of the detected speed value ($N_{ab}$) detected after the engine start.

13. A method for generating a fault signal (F) in a motor vehicle having a vehicle engine, a clutch and a transmission and a vehicle engine, the clutch being mounted in the drive train of the vehicle and the transmission being mounted in the drive train and being changeable with respect to its transmission ratio; the fault signal (F) representing the function of a device for generating a clutch signal ($K_{on/off}$), which represents the actuation of the clutch, the method comprising the steps of:

detecting a start of said vehicle engine;

detecting of a speed value ($N_{ab}$) which represents the vehicle longitudinal speed;

generating said fault signal (F) in dependence upon the recognized engine start, the generated clutch signal ($K_{on/off}$) and the detected speed value ($N_{ab}$); and, the fault signal is only generated when the speed value ($N_{ab}^{start}$) is essentially zero, the speed value ($N_{ab}^{start}$) being detected with recognized engine start.

* * * * *

UNITED STATES PATENT AND TRADEMARK OFFICE
CERTIFICATE OF CORRECTION

PATENT NO.    : 6,466,852 B2
DATED         : October 15, 2002
INVENTOR(S)   : Martin Froehlich, Mario Bajic and Klaus Ries-Mueller It is certified that error appears in the above-identified patent and that said Letters Patent is hereby corrected as shown below:

<u>Column 5,</u>
Line 60, delete "chance" and substitute -- change -- therefor.

Signed and Sealed this

Nineteenth Day of August, 2003

JAMES E. ROGAN
*Director of the United States Patent and Trademark Office*